US012659739B2

(12) United States Patent
Huang

(10) Patent No.: US 12,659,739 B2
(45) Date of Patent: Jun. 16, 2026

(54) SECURE CHANNEL ESTABLISHING METHOD AND APPARATUS, AND RELATED DEVICE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Xiaoting Huang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 181 days.

(21) Appl. No.: 18/681,943

(22) PCT Filed: Aug. 8, 2022

(86) PCT No.: PCT/CN2022/110922
§ 371 (c)(1),
(2) Date: Feb. 7, 2024

(87) PCT Pub. No.: WO2023/016420
PCT Pub. Date: Feb. 16, 2023

(65) Prior Publication Data
US 2024/0349049 A1 Oct. 17, 2024

(30) Foreign Application Priority Data

Aug. 9, 2021 (CN) .......................... 202110910311.1

(51) Int. Cl.
*H04W 12/04* (2021.01)
*H04W 12/041* (2021.01)
(Continued)

(52) U.S. Cl.
CPC ......... *H04W 12/06* (2013.01); *H04W 12/041* (2021.01); *H04W 12/0431* (2021.01); *H04W 12/0433* (2021.01)

(58) Field of Classification Search
CPC ............... H04W 12/06; H04W 12/041; H04W 12/0431; H04W 12/0433
See application file for complete search history.

(56) References Cited

U.S. PATENT DOCUMENTS

| | | | |
|---|---|---|---|
| 2003/0018886 | A1 | 1/2003 | Kuehr-McLaren |
| 2014/0289826 | A1 | 9/2014 | Croome |

(Continued)

FOREIGN PATENT DOCUMENTS

| | | |
|---|---|---|
| CN | 112512043 A | 3/2021 |
| CN | 113163399 A | 7/2021 |

(Continued)

OTHER PUBLICATIONS

3GPP TR 33.862 V0.5.0 May 2021 (Year: 2021).*

(Continued)

*Primary Examiner* — David J Pearson
(74) *Attorney, Agent, or Firm* — COOPER LEGAL GROUP LLC

(57) ABSTRACT

Disclosed in the present application are a secure channel establishing method and apparatus, and an MSGin5G UE, an MSGin5G server and a storage medium. The method comprises: an MSGin5G UE generating a first key on the basis of an authentication and key management for application (Continued)

(AKMA) service; and on the basis of the first key, establishing a secure channel between the MSGin5G UE and an MSGin5G server.

13 Claims, 7 Drawing Sheets

(51) Int. Cl.
　　*H04W 12/0431*　　(2021.01)
　　*H04W 12/0433*　　(2021.01)
　　*H04W 12/06*　　(2021.01)

(56) References Cited

U.S. PATENT DOCUMENTS

| | | | | |
|---|---|---|---|---|
| 2019/0223009 | A1* | 7/2019 | Salmela | H04W 12/0431 |
| 2021/0058780 | A1 | 2/2021 | Yu | |
| 2021/0165885 | A1* | 6/2021 | Zhang | H04L 9/3213 |
| 2022/0264292 | A1 | 8/2022 | Yu | |
| 2023/0070253 | A1* | 3/2023 | Rajadurai | H04W 12/06 |
| 2024/0314561 | A1* | 9/2024 | Rohini | H04W 12/069 |

FOREIGN PATENT DOCUMENTS

| | | | |
|---|---|---|---|
| JP | 2008099245 | A | 4/2008 |
| WO | 2021093162 | A1 | 5/2021 |

OTHER PUBLICATIONS

Supplementary European Search Report in the European application No. 22855401.0, mailed on Oct. 14, 2024. 10 pages.

3GPP TR 33.862 vo.5.0 (May 2021), "3rd Generation Partnership Project; Technical Specification Group Services and System Aspects; Study on security aspects of the Message Service for MIoT over the 5G System (MSGin5G)", 3GPP Draft; S3-212215, 3rd Generation Partnership Project (3GPP), MobileCompetence Centre ; 650, Route Des Lucioles ; F-06921 Sophia-Antipolis Cedex; France, May 31, 2021 (May 31, 2021), XP052023746, p. 16-p. 17.

SA3: "Security aspects of the 5GMSG Service", 3GPP Draft; SP-210835, 3rd Generation Partnership Project (3GPP), Mobile Competence Centre;650, Route Des Lucioles ; F-06921 Sophia-Antipolis Cedex; France vol. TSG SA, No. Electronic; Sep. 14, 20210914-202109206 Sep. 2021 (Sep. 6, 2021), XP052051901, Objective, both bullet items; paragraph [0002].

"5G; Authentication and Key Management for Applications (AKMA) based on 3GPP credentials in the 5G System (5GS) (3GPP TS 33.535 version 16.2.0 Release 16)", ETSI Technical Specification, European Telecommunications Standards Institute (ETSI), 650, Route Des Lucioles ; F-06921 Sophia-Antipolis; France vol. 3GPP SA, No. V16.2.012 Jan. 2021 (Jan. 1, 2021), pp. 1-22, XP014390281, p. 11-p. 16.

One2many et al: "Pseudo-CR on Message Aggregation", 3GPP Draft; S6-210386, 3rd Generation Partnership Project (3GPP), Mobile Competence Centre; 650, Route Des Lucioles; F-06921 Sophia-Antipolis Cedex; France vol. Sa WG6, No. e-meeting; Mar. 1, 2021-Mar. 9, 2021 Feb. 24, 2021 (Feb. 24, 2021), XP051981052, the whole document.

China Mobile, "Solution to provisioning of PNI-NPN credentials", 3GPP TSG-SA3 Meeting #102-e S3-210318, e-meeting, Jan. 18-29, 2021, section 6.X.2. 3 pages.

International Search Report in the international application No. PCT/CN2022/110922, mailed on Sep. 27, 2022. 2 pages.

English translation of the Written Opinion of the International Search Authority in the international application No. PCT/CN2022/110922, mailed on Sep. 27, 2022. 5 pages.

3GPP TS 33.535 V17.2.1 (Jun. 2021), 3rd Generation Partnership Project; Technical Specification Group Services and System Aspects; Authentication and Key Management for Applications (AKMA) based on 3GPP credentials in the 5G System (5GS) (Release 17), pp. 1-24.

3GPP TS 33.501 V17.5.0 (Jun. 2021), 3rd Generation Partnership Project; Technical Specification Group Services and System Aspects; Security architecture and procedures for 5G system (Release 17), section Annex Y, pp. 282-283.

3GPP TS 23.554 V19.5.0 (Mar. 2025), 3rd Generation Partnership Project; Technical Specification Group Services and System Aspects; Application architecture for MSGin5G Service; Stage 2 (Release 19), section 8.7.

3GPP TS 22.262 V18.0.1 (Mar. 2024), 3rd Generation Partnership; Technical Specification Group Services and System Aspects; Message Service within the 5G System; Stage 1 (Release 18), pp. 1-11.

"3rd Generation Partnership Project; Technical Specification Group Services and System Aspects; Authentication and key management for applications; based on 3GPP credential in 5G (AKMA) (Release 16)", 3GPP TS 33.535 V0.4.0 (Apr. 2020), 15 pages.

* cited by examiner

SECURE CHANNEL ESTABLISHING METHOD AND APPARATUS, AND RELATED DEVICE AND STORAGE MEDIUM

CROSS-REFERENCE TO RELATED APPLICATIONS

This is a national phase application of International Application No. PCT/CN2022/110922, filed on Aug. 8, 2022, which claims priority to Chinese Patent Application No. 202110910311.1 filed on Aug. 9, 2021. The disclosures of International Application No. PCT/CN2022/110922 and Chinese Patent Application No. 202110910311.1 are hereby incorporated by reference in their entireties.

TECHNICAL FIELD

The disclosure relates to the field of network security, and particularly to a method and apparatus for secure channel establishment, a related device, and a storage medium.

BACKGROUND

In the related art, a fifth generation mobile communication technology (5G) message service, as well as an architecture and a flow of the service at an application layer, is defined, as shown in FIG. 1. An urgent problem to be solved is how to secure the 5G message service, and particularly how to secure network information between a 5G message user equipment (MSGin5G UE) and a 5G message server (MSGin5G server).

SUMMARY

To solve the problem in the related art, embodiments of the disclosure provide a method and apparatus for secure channel establishment, a device, and a storage medium.

A technical solution according to embodiments of the disclosure is implemented as follows.

The embodiments of the disclosure provide a method for secure channel establishment, applied to a fifth generation message (MSGin5G) user equipment (UE). The method includes operations as follows.

A first key is generated based on an authentication and key management for application (AKMA) service.

A secure channel between the MSGin5G UE and an MSGin5G server is established based on the first key.

In the solution, the operation that the secure channel between the MSGin5G UE and the MSGin5G server is established based on the first key includes the following operations.

A third key is generated based on the first key, and a client key exchange message including a first identity (ID) is sent to the MSGin5G server.

A transport layer security (TLS) secure channel between the MSGin5G UE and the MSGin5G server is established.

In the solution, before the first key is generated based on the AKMA service, the method may further include the following operation.

Primary authentication between the MSGin5G UE and a core network is performed.

In the solution, the operation that the first key is generated based on the AKMA service includes the following operations.

A session establishment request is sent to the MSGin5G server. The session establishment request includes at least a first identity (ID).

The first key is generated using a second key identified by the first ID. The second key and the first ID may be generated based on the AKMA service.

In the solution, generation of the first key using the second key identified by the first ID is performed before or after sending the session establishment request to the MSGin5G server.

In the solution, the method may further include the following operation.

A session establishment response sent by the MSGin5G server is received.

Generation of the first key is performed before or after receiving the session establishment response.

The embodiments of the disclosure further provide a method for secure channel establishment, applied to a fifth generation message (MSGin5G) server. The method includes operations as follows.

A first key is acquired based on an authentication and key management for application (AKMA) service.

A secure channel between the MSGin5G server and an MSGin5G user equipment (UE) is established based on the first key.

In the solution, the operation that the secure channel between the MSGin5G server and the MSGin5G UE is established based on the first key includes the following operations.

A client key exchange message sent by the MSGin5G UE is received. The client key exchange message includes a first identity (ID).

The first key is acquired according to the first ID, a third key is generated using the first key, and a transport layer security (TLS) secure channel between the MSGin5G server and the MSGin5G UE is established.

In the solution, the operation that the first key is acquired based on the AKMA service includes the following operations.

A session establishment request sent by the MSGin5G UE is received. The session establishment request includes at least a first identity.

A key request is sent to a core network. The key request includes at least the first ID.

First information sent by the core network is received. The first information may include at least the first key. The first key may be generated based on a second key identified by the first ID. The second key and the first ID may be generated based on the AKMA service.

In the solution, the first information may further include a cycle of the first key.

The embodiments of the disclosure further provide an apparatus for secure channel establishment, including a first processing unit and a second processing unit.

The first processing unit is configured to generate a first key based on an authentication and key management for application (AKMA) service.

The second processing unit is configured to establish a secure channel between a fifth generation message (MSGin5G) user equipment (UE) and an MSGin5G server based on the first key.

The embodiments of the disclosure further provide an apparatus for secure channel establishment, including a third processing unit and a fourth processing unit.

The third processing unit is configured to acquire a first key based on an authentication and key management for application (AKMA) service.

The fourth processing unit is configured to establish a secure channel between a fifth generation message (MSGin5G) server and an MSGin5G user equipment (UE) based on the first key.

The embodiments of the disclosure further provide a fifth generation message (MSGin5G) user equipment (UE), including a first communication interface and a first processor.

The first processor is configured to: generate a first key based on an authentication and key management for application (AKMA) service; and establish a secure channel between the MSGin5G UE and an MSGin5G server based on the first key.

The embodiments of the disclosure further provide a fifth generation message (MSGin5G) server, including a second communication interface and a second processor.

The second processor is configured to: acquire a first key based on an authentication and key management for application (AKMA) service; and establish a secure channel between the MSGin5G server and an MSGin5G user equipment (UE) based on the first key.

The embodiments of the disclosure further provide a fifth generation message (MSGin5G) user equipment (UE), including a first processor and a first memory configured to store a computer program executable on the first processor.

The first processor is configured to execute the computer program to perform the operations of any one method at the MSGin5G UE side.

The embodiments of the disclosure further provide a fifth generation message (MSGin5G) server, including a second processor and a second memory configured to store a computer program executable on the second processor.

The second processor is configured to execute the computer program to perform the operations of any one method at the MSGin5G server side.

The embodiments of the disclosure further provide a storage medium, having stored thereon a computer program. When executed by a processor, the computer program implements the operations of any one method at the MSGin5G UE side, or implements the operations of any one method at the MSGin5G server side.

With a method and apparatus for secure channel establishment, related devices, and a storage medium according to embodiments of the disclosure, the MSGin5G UE generates the first key based on the AKMA service; the MSGin5G server acquires the first key based on the AKMA service; and the MSGin5G UE and the MSGin5G server establish the secure channel between the MSGin5G UE and the MSGin5G server based on the first key. With the solution according to embodiments of the disclosure, the MSGin5G UE and the MSGin5G server acquire a first key based on an AKMA service, and establish a secure channel between the MSGin5G UE and the MSGin5G server based on the first key. Thus, for protection of an interface between the MSGin5G UE and the MSGin5G server, no authentication credential needs to be preset at the MSGin5G UE, and no additional authentication mechanism, such as an authentication mechanism using the SEAL architecture, the extensible authentication protocol (EAP) authentication framework, etc., is needed, and no new requirement is put on the UE. Fast authentication between the MSGin5G UE and the MSGin5G server at the application layer is implemented only based on the AKMA service, thereby securing the interface between the MSGin5G UE and the MSGin5G server.

DETAILED DESCRIPTION

The disclosure is further elaborated below with reference to the drawings and embodiments.

Figure 1:
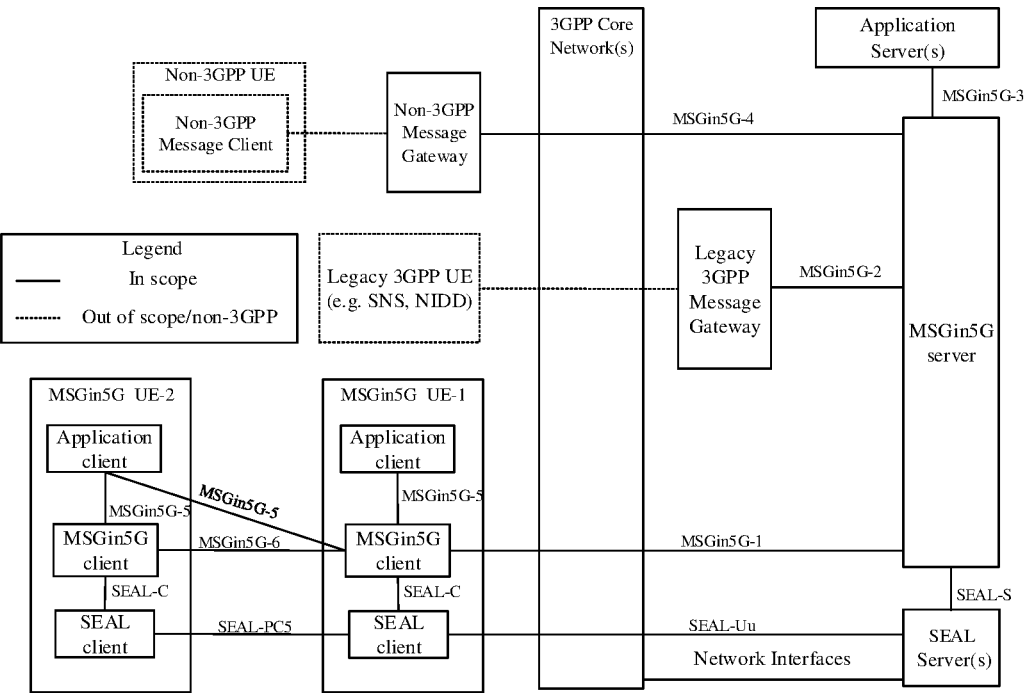
FIG. 1 is a schematic diagram of an architecture of a 5G message service at the application layer in the related art.

In the related art, to secure network information between an MSGin5G UE and an MSGin5G server, authentication, authorization, and a corresponding interface (i.e., MSGin5G-1 interface illustrated in FIG. 1) between the MSGin5G UE and the MSGin5G server may be secured in two modes as follows.

In mode 1, the MSGin5G UE and the MSGin5G server may perform authentication based on the SEAL architecture.

Specifically, a SEAL server sends an access token to a SEAL UE (i.e., an MSGin5G UE installed with a SEAL client). After the MSGin5G UE accesses the MSGin5G server with the token, the MSGin5G server needs to interface with the SEAL server to verify the token. The MSGin5G server may permit a subsequent service interaction request from the UE after the token has been verified.

Figure 2:
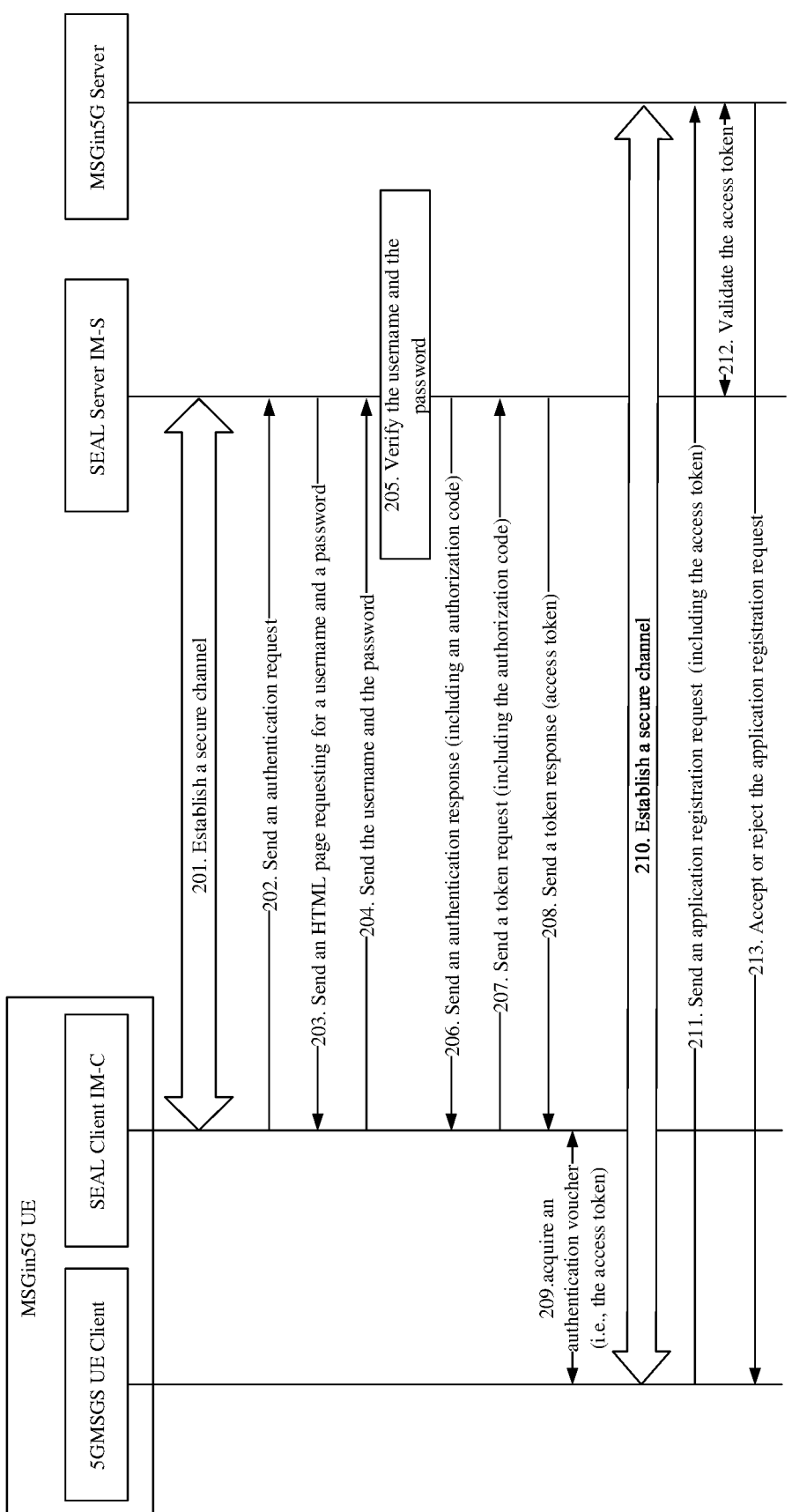
FIG. 2 is a schematic flowchart of performing authentication by an MSGin5G UE and an MSGin5G server based on a service enabler architecture layer (SEAL) architecture in the related art.

As shown in FIG. 2, the process that the MSGin5G UE and the MSGin5G server perform authentication based on the SEAL architecture may include operations as follows.

In 201, a SEAL client of the MSGin5G UE establishes a secure channel with a SEAL server. Then, the process may go to 202.

In 202, the SEAL client sends an authentication request to the SEAL server. Then, the process may go to 203.

Here, the MSGin5G UE may send the authentication request, such as an OpenID Connect (OIDC) authentication request, based on an authentication mode supported by the MSGin5G UE.

In 203, the SEAL server sends, to the SEAL client, a hyper text markup language (HTML) page requesting for a username and a password. Then, the process may go to 204.

In 204, the SEAL client sends the username and the password to the SEAL server. Then, the process may go to 205.

Here, the SEAL client may send the username and the password to the SEAL server based on the HTML page.

In 205, the SEAL server verifies the username and the password. The process may go to 206 after the username and the password have been verified.

In 206, the SEAL server sends an authentication response to the SEAL client.

Then, the process may go to 207.

Here, the authentication response may include an authorization code (AuthCode for short). The authentication response may correspond to the authentication request in 202. That is, the authentication response is an OIDC authentication response when the authentication request is the OIDC authentication request.

In 207, the SEAL client sends a token request (such as an OIDC token request) to the SEAL server. Then, the process may go to 208.

Here, the token request includes the AuthCode.

In 208, the SEAL server sends a token response to the SEAL client. Then, the process may go to 209.

Here, the token response includes an access token.

In 209, a 5G message service client (5GMSGS UE client) of the MSGin5G UE acquires an authentication credential (i.e., the access token) from the SEAL client. Then, the process may go to 210.

In 210, the 5GMSGS UE client establishes a secure channel with the MSGin5G server. Then, the process may go to 211.

In 211, the 5GMSGS UE client sends an application registration request to the MSGin5G server. Then, the process may go to 212.

Here, the application registration request includes the access token.

In 212, the MSGin5G server interfaces with the SEAL server to verify the access token. Then, the process may go to 213.

In 213, the MSGin5G server accepts or rejects the application registration request sent by the 5GMSGS UE client.

Here, the MSGin5G server may determine whether to accept or reject the application registration request sent by the 5GMSGS UE client according to a result of verifying the access token.

In mode 2, the MSGin5G UE and the MSGin5G server may perform a second authentication.

Specifically, the MSGin5G UE and the MSGin5G server perform the second authentication when the MSGin5G UE completes a 5G primary authentication (a first authentication) and a session management function (SMF) establishes a protocol data unit (PDU) session. That is, the MSGin5G server may perform an extensible authentication protocol (EAP) authentication on the MSGin5G UE. Upon authentication success, the SMF may establish the PDU session for the MSGin5G UE to access the MSGin5G server.

Figure 3:
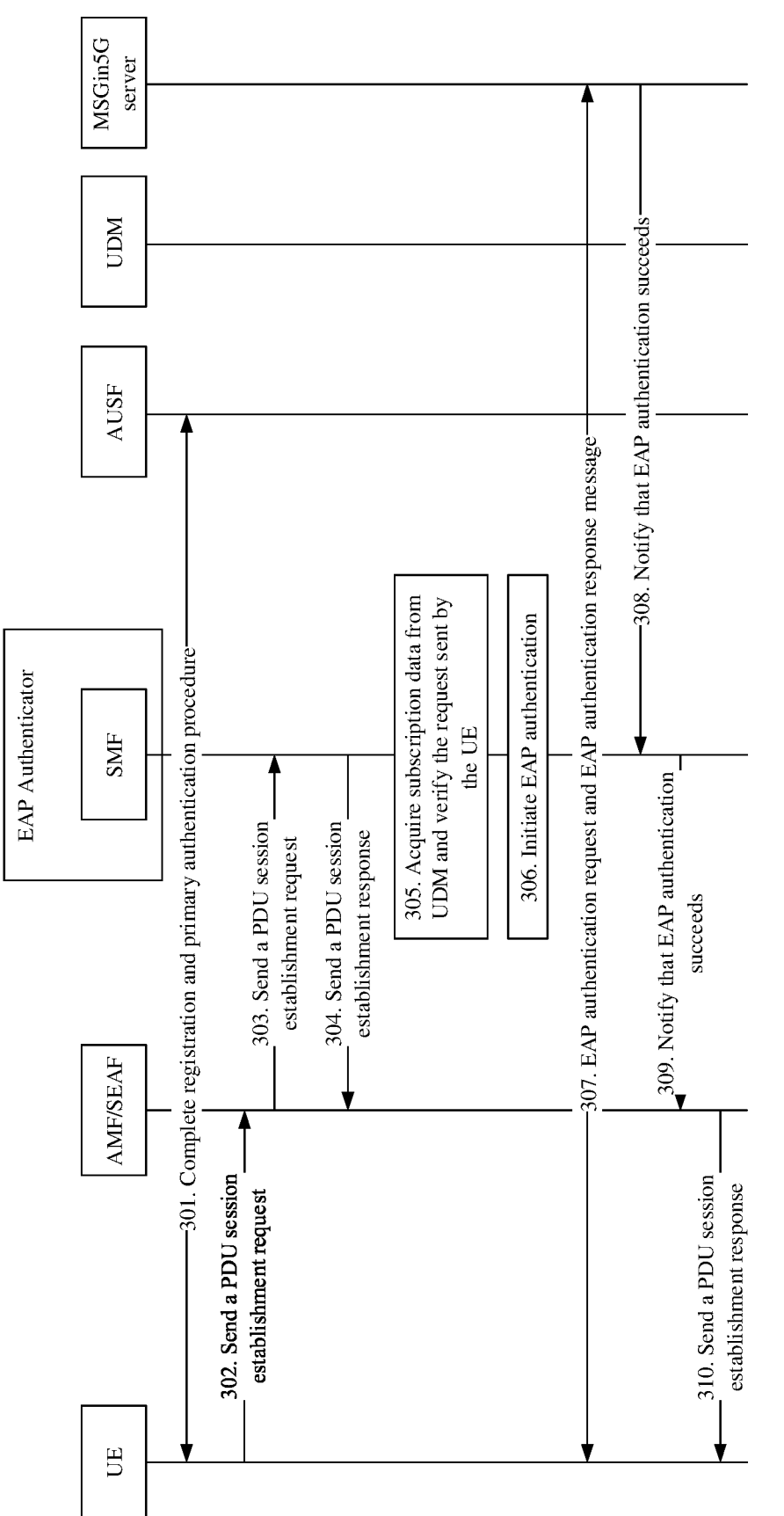
FIG. 3 is a schematic flowchart of performing a second authentication by an MSGin5G UE and an MSGin5G server in the related art.

As shown in FIG. 3, the process that the MSGin5G UE and the MSGin5G server perform the second authentication may include operations as follows.

In 301, a UE (i.e., the MSGin5G UE) interacts with an authentication server function (AUSF) to complete a registration and primary authentication procedure. Then, the process may go to 302.

In 302, the UE sends a PDU session establishment request to an access and mobility management function (AMF) or a security anchor function (SEAF). Then, the process may go to 303.

In 303, the AMF or the SEAF sends a PDU session establishment request (Nsmf_PDUsession_EstablishSM-Context Request) to the SMF. Then, the process may go to 304.

In 304, the SMF sends a PDU session establishment response (Nsmf_PDUsession_EstablishSMContext Response) to the AMF or the SEAF. Then, the process may go to 305.

In 305, the SMF obtains subscription data from a unified data management (UDM) and verify the request sent by the UE. Then, the process may go to 306.

In 306, the SMF initiates the EAP authentication. Then, the process may go to 307.

In 307, the UE exchanges an EAP authentication request message and an EAP authentication response message with a data network-authentication, authorization and accounting (DN-AAA) server (i.e., the MSGin5G server). The process may go to 308 upon the EAP authentication is completed.

In 308, the DN-AAA notifies the SMF of the EAP authentication success. Then, the process may go to 309.

In 309, the SMF notifies the AMF or the SEAF of the EAP authentication success. Then, the process may go to 310.

In 310, the AMF or the SEAF sends a PDU session establishment response to the UE. The UE accesses the MSGin5G server.

In actual application, the mode 1 has the following disadvantages.

1) The MSGin5G UE needs to install a SEAL client to realize one ore more SEAL-related functions. However, limited by a resource cost, a SEAL client cannot be installed on a lightweight MSGin5G UE, i.e., an MSGin5G UE with limited computing resources and/or storage resources, such as an internet of things (IoT) UE (including various sensors, etc.).

2) The interaction flow is complicated. Specifically, when the MSGin5G UE sends a request including the access token to the MSGin5G server, the MSGin5G server has to request the SEAL server to verify the token. In other words, interaction of the MSGin5G server with the SEAL server is needed in the flow.

In actual application, the mode 2 has the following disadvantages.

1) Only the access authentication for the MSGin5G UE by the MSGin5G server may be implemented, but security of a communication channel between the MSGin5G server and the MSGin5G UE cannot be ensured. Therefore, an additional mode of protection for a communication interface between the MSGin5G server and the MSGin5G UE is needed.

2) The MSGin5G server has to use an EAP authentication framework. However, an MSGin5G server at some application layer in the related art may not support the EAP authentication framework.

3) An authentication credential to be used in the second authentication, such as a username, a password, etc., has to be preset at the MSGin5G UE in advance, however, the security of the preset credential cannot be guaranteed.

In view of this, in various embodiments of the disclosure, an MSGin5G UE and an MSGin5G server acquire a first key based on an authentication and key management for application (AKMA) service, and establish a secure channel between the MSGin5G UE and the MSGin5G server based on the first key. Thus, for protection of an interface between the MSGin5G UE and the MSGin5G server, compared to mode 1 and mode 2, with the solution according to embodiments of the disclosure, no authentication credential needs to be preset at the MSGin5G UE, and no additional authentication mechanism, such as an authentication mechanism using the SEAL architecture, the EAP authentication framework, etc., is needed, and no new requirement is put on the UE. Fast authentication between the MSGin5G server and the MSGin5G UE at the application layer is implemented only based on the AKMA service, while meeting a need for authentication between a lightweight MSGin5G UE and the MSGin5G server, thereby securing the interface between the MSGin5G UE and the MSGin5G server.

Figures 4, 5:
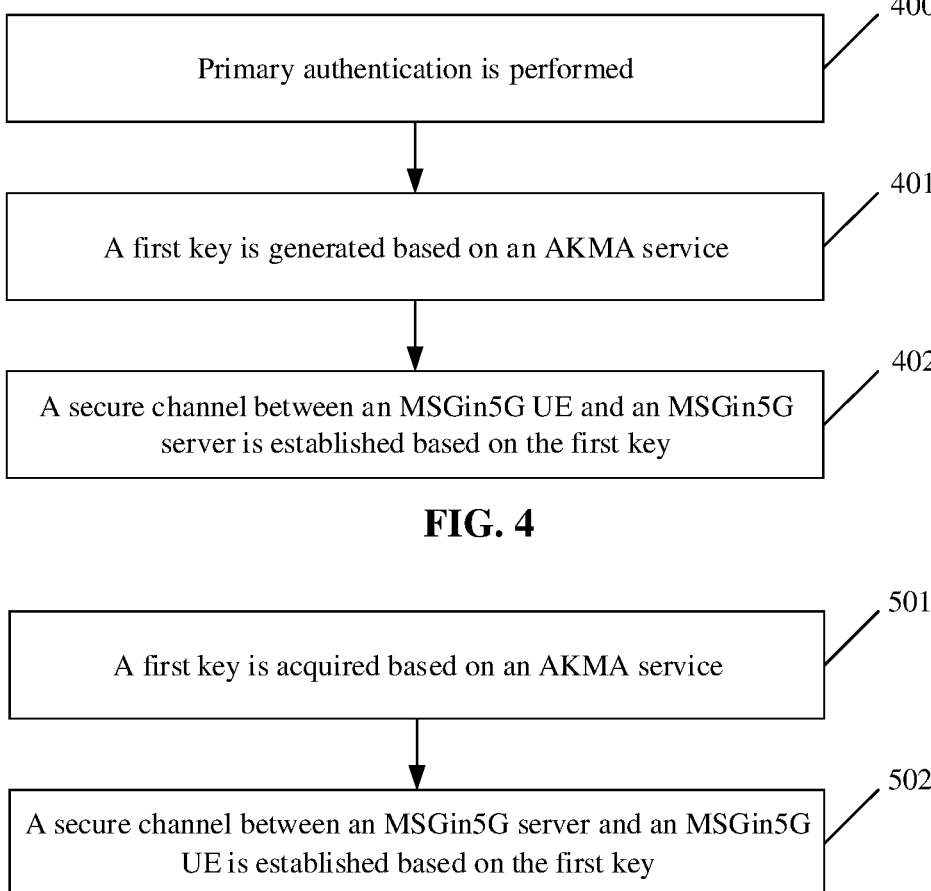
FIG. 4 is a schematic flowchart of a method for secure channel establishment according to an embodiment of the disclosure.
FIG. 5 is a schematic flowchart of another method for secure channel establishment according to an embodiment of the disclosure.

Embodiments of the disclosure provide a method for secure channel establishment, applied to an MSGin5G UE. As shown in FIG. 4, the method includes operations as follows.

In 401, a first key is generated based on an AKMA service.

In 402, a secure channel between the MSGin5G UE and an MSGin5G server is established based on the first key.

Here, establishment of the secure channel between the MSGin5G UE and the MSGin5G server may refer to establishment of a secure channel for data transmission between the MSGin5G UE and the MSGin5G server. The MSGin5G UE and the MSGin5G server may perform data transmission based on the secure channel after the secure channel has been established, thereby securing the interface between the MSGin5G UE and the MSGin5G server.

In actual application, the MSGin5G UE needs to access a network first, and then establish the secure channel with the MSGin5G server based on the AKMA service.

In view of this, in an embodiment, as shown in FIG. 4, before the operation in 401, the method further includes the following operation.

In 400, primary authentication is performed.

That is, the MSGin5G UE may perform primary authentication between the MSGin5G UE and a core network.

In actual application, in 400, the MSGin5G UE may complete primary authentication at a 5G network by interacting with a 5G core network (5GC) of an operator, specifically with a functional entity such as the AUSF, based on a primary authentication procedure defined in the related art. A specific mode of the primary authentication is not limited in embodiments of the disclosure.

In embodiments of the disclosure, for protection of an interface between the MSGin5G UE and the MSGin5G server, no authentication credential needs to be preset at the MSGin5G UE, no additional authentication mechanism is needed, and no new requirement is put on the UE. Fast authentication between the MSGin5G server and the MSGin5G UE at the application layer is implemented using just an primary authentication credential for network access (i.e., a key stored at a subscriber identity module (SIM) card and an operator network for the subscriber to access the operator network, i.e., to perform the primary authentication) and based on the AKMA service, thereby securing the interface between the MSGin5G UE and the MSGin5G server.

In an embodiment, the operation in 401 that the first key is generated based on the AKMA service may include the following.

An access request is sent to the MSGin5G server. The access request may include at least a first identity (ID). The first key is generated using a second key identified by the first ID. The second key may be generated based on the AKMA service.

An access response sent by the MSGin5G server is received.

Sending of the access request to the MSGin5G server may refer to sending of a session establishment request to the MSGin5G server. The session establishment request may include/carry at least the first ID. Correspondingly, receiving of the access response sent by the MSGin5G server may refer to receiving of a session establishment response sent by the MSGin5G server.

In an embodiment, the method may further include the following operation.

The second key and the first ID are acquired based on the AKMA service after the primary authentication has been completed.

Specifically, in actual application, after the MSGin5G UE has completed the primary authentication in 400, the MSGin5G UE may interact with the core network, specifically with a functional entity such as the AUSF of the core network and the like, to generate a key KAUSF. If the MSGin5G UE supports, registers for, and subscribes to the AKMA service, the MSGin5G UE and the core network may generate an AKMA intermediate key KAKMA (i.e., the second key) and a key identifier A-KID (i.e., the first ID) corresponding to the intermediate key based on the key KAUSF and the AKMA service.

In actual application, sending of the access request to the MSGin5G server and receiving of the access response sent by the MSGin5G server may be performed before or after generation of the first key. In other words, the MSGin5G UE may first send the access request to the MSGin5G server, and then generate the first key. That is, the first key may be generated using the second key identified by the first ID after the session establishment request has been sent to the MSGin5G server. Alternatively, the MSGin5G UE may first generate the first key, and then send the access request. That is, the first key may be generated using the second key identified by the first ID before the session establishment request is sent to the MSGin5G server. Correspondingly, the MSGin5G UE may first receive the access response sent by the MSGin5G server, and then generate the first key. That is, the first key may be generated after the session establishment response has been received. Alternatively, the MSGin5G UE may first generate the first key, and then receive the access response. That is, the first key may be generated before the session establishment response is received.

In actual application, after the MSGin5G server receives the access request carrying the first ID sent by the MSGin5G UE, the MSGin5G server may send a key request carrying the first ID to the core network. The core network may determine a second key according to the first ID, generate the first key using the second key, and send the generated first key to the MSGin5G server. After the MSGin5G server receives the first key, the MSGin5G server may send the access response to the MSGin5G UE.

In actual application, a specific mode in which the core network and the MSGin5G UE generate the first key using the second key may be set as needed, and is not limited in the embodiments of the disclosure. Exemplarily, the core network and the MSGin5G UE may generate the first key using the second key and an ID (MSGin5G Server ID) corresponding to the MSGin5G server in combination with a preset algorithm such as a key derivation function (KDF), etc. The preset algorithm may be negotiated by the MSGin5G UE and the core network, or may be an algorithm preset by the operator, which is not limited in the embodiments of the disclosure.

In actual application, the core network may determine a cycle (also referred to as a lifecycle) of the first key using a preset policy. For example, a functional entity such as an AKMA anchor function (AAnF) determines the cycle of the first key. A specific mode of determining the cycle of the first key is not limited in embodiments of the disclosure. Exemplarily, the core network may determine the cycle of the first key according to the requirements of the 5G message service and a key management policy of the operator.

In actual application, the core network may further send the cycle of the first key to the MSGin5G server when sending the generated first key to the MSGin5G server. The MSGin5G server may maintain the first key according to the cycle of the first key. That is, the MSGin5G server may send a key update request to the core network when it is determined that the first key is about to expire according to the cycle of the first key. Upon receiving the key update request, the core network may generate a new first key according to the AKMA service, and return the new first key to the MSGin5G server. After the MSGin5G server receives the new first key, the MSGin5G server may send a key update instruction to the MSGin5G UE, to instruct the MSGin5G UE to update the first key. Here, a mode in which the MSGin5G UE updates the first key may be set as needed, and is not limited in embodiments of the disclosure. Exemplarily, the MSGin5G UE accesses the 5G network again, i.e., performs the primary authentication again.

In 403, in actual application, to establish the secure channel between the MSGin5G UE and the MSGin5G server based on the first key, one way is that the MSGin5G UE and the MSGin5G server encrypt data to be transmitted using the first key. In another way, the MSGin5G UE and the MSGin5G server establish a secure channel of a type such as a transport layer security (TLS) channel based on the first key.

In view of this, in an embodiment, the operation that the secure channel between the MSGin5G UE and the MSGin5G server is established based on the first key may include the following operation.

A TLS secure channel (also referred to as a TLS tunnel) between the MSGin5G UE and the MSGin5G server is established based on the first key.

The operation that the TLS secure channel between the MSGin5G UE and the MSGin5G server is established based on the first key may include the following operations.

A third key is generated based on the first key, and a client key exchange (ClientKeyExchange) message including a first identity (ID) is sent to the MSGin5G server.

A TLS secure channel between the MSGin5G UE and the MSGin5G server is established. That is, the TLS secure channel between the MSGin5G UE and the MSGin5G server may be established based on the third key.

Specifically, in actual application, the MSGin5G UE sends a TLS secure channel establishment request to the MSGin5G server. The TLS secure channel establishment request may include second information and third information. The second information may represent an encryption algorithm(s) based on a pre-shared key (PSK). The third information may represent that the MSGin5G UE supports TLS based on the PSK.

After the MSGin5G server receives the TLS secure channel establishment request, the MSGin5G server may select an encryption algorithm from the encryption algorithm(s) represented by the second information, and send a TLS secure channel establishment response including the selected encryption algorithm. Meanwhile, the MSGin5G server may send fourth information to the MSGin5G UE. The fourth information may represent that the MSGin5G server supports an AKMA protocol.

After the MSGin5G UE receives the TLS secure channel establishment response, the MSGin5G UE may perform a TLS handshake with the MSGin5G server. During the TLS handshake, the MSGin5G UE may generate a premaster key (denoted by the third key hereinafter) for the TLS secure channel using the first key, and send a client key exchange (ClientKeyExchange) message including the first ID to the MSGin5G server. The MSGin5G server may acquire the first key according to the first ID, generate the third key using the first key, and send a change cipher suite (ChangeCipher-Suite) message and a finished message to the MSGin5G UE to end the TLS handshake and establish the TLS secure channel. The TLS secure channel may protect data exchange between the MSGin5G UE and the MSGin5G server, thereby securing the interface between the MSGin5G UE and the MSGin5G server.

The MSGin5G UE and the MSGin5G server may need a symmetrical key to establish the TLS secure channel. In embodiments of the disclosure, no additional authentication mechanism is needed, nor any authentication credential has to be preset at the MSGin5G UE, and no new requirement is put on the UE; a symmetrical key may be acquired with the help of the AKMA service, thereby implementing fast authentication and authentication between the MSGin5G server and the MSGin5G UE at the application layer, and securing the interface between the MSGin5G UE and the MSGin5G server.

Correspondingly, the embodiments of the disclosure further provide a method for secure channel establishment, applied to an MSGin5G server. As shown in FIG. 5, the method includes operations as follows.

In 501, a first key is acquired based on an AKMA service.

In 502, a secure channel between the MSGin5G server and an MSGin5G UE is established based on the first key.

Here, establishment of the secure channel between the MSGin5G server and the MSGin5G UE may refer to establishment of a secure channel for data transmission between the MSGin5G server and the MSGin5G UE. The MSGin5G server and the MSGin5G UE may perform data transmission based on the secure channel after the secure channel has been established, thereby securing the interface between the MSGin5G UE and the MSGin5G server.

In an embodiment, the operation that the first key is acquired based on the AKMA service may include the following.

An access request sent by the MSGin5G UE is received. The access request carries at least a first identity (ID).

A key request is sent to a core network. The key request carries at least the first ID.

First information sent by the core network is received. The first information includes at least the first key generated based on a second key identified by the first ID. The second key and the first ID may be generated based on the AKMA service.

Here, receiving of the access request sent by the MSGin5G UE may refer to receiving of a session establishment request sent by the MSGin5G UE. The session establishment request carries at least the first ID.

Specifically, in actual application, the MSGin5G UE may complete the primary authentication at the 5G network by interacting with the 5GC of the operator based on the primary authentication procedure defined in the related art.

After the MSGin5G UE has accessed the core network and completed the primary authentication, the MSGin5G UE and the core network may generate the key KAUSF. If the MSGin5G UE supports, registers for, and subscribes to the AKMA service, the MSGin5G UE and the core network may generate the second key and the first ID corresponding to the second key based on the key KAUSF and the AKMA service. After the MSGin5G UE acquires the second key and the first ID, the MSGin5G UE may send the access request to the MSGin5G server.

In actual application, after receiving the key request, the core network may determine the second key using the first ID, generate the first key using the second key, and send the generated first key to the MSGin5G server through the first information. After receiving the first key, the MSGin5G server may send the access response to the MSGin5G UE.

Sending of the access response to the MSGin5G UE may refer to sending of a session establishment response to the MSGin5G UE.

In actual application, the MSGin5G server may further maintain the first key.

In view of this, in an embodiment, the first information further includes a cycle of the first key. The method may further include the following operation.

The first key may be maintained according to the cycle of the first key.

Specifically, in actual application, the MSGin5G server may send a key update request to the core network when determining that the first key is about to expire according to the cycle of the first key. Upon receiving the key update request, the core network may generate a new first key according to the AKMA service, and send the new first key to the MSGin5G server. After receiving the new first key, the MSGin5G server may send a key update instruction to the MSGin5G UE, to instruct the MSGin5G UE to update the first key.

In 502, in actual application, to establish the secure channel between the MSGin5G server and the MSGin5G UE based on the first key, one way is that the MSGin5G server and the MSGin5G UE encrypt data to be transmitted using the first key. In another way, the MSGin5G server and the MSGin5G UE establish a secure channel of a type such as a transport layer security (TLS) channel based on the first key.

In view of this, in an embodiment, the operation that the secure channel between the MSGin5G server and the MSGin5G UE is established based on the first key may include the following operation.

A TLS secure channel between the MSGin5G server and the MSGin5G UE is established based on the first key.

The operation that the TLS secure channel between the MSGin5G server and the MSGin5G UE is established based on the first key may include the following operations.

A client key exchange message including a first identity (ID) sent by the MSGin5G UE is received.

The first key is acquired according to the first ID, the third key is generated using the first key, and the TLS secure channel between the MSGin5G server and the MSGin5G UE is established. That is, the TLS secure channel between the MSGin5G server and the MSGin5G UE may be estab- lished based on the third key.

Here, the process of establishing the TLS secure channel by the MSGin5G UE and the MSGin5G server is as described above, which is not elaborated here.

With the method for secure channel establishment accord- ing to embodiments of the disclosure, the MSGin5G UE generates the first key based on the AKMA service; the MSGin5G server acquires the first key based on the AKMA service; and the MSGin5G UE and the MSGin5G server establish the secure channel between the MSGin5G UE and the MSGin5G server based on the first key. With the solution according to embodiments of the disclosure, the MSGin5G UE and the MSGin5G server acquire a first key based on an AKMA service, and establish a secure channel between the MSGin5G UE and the MSGin5G server based on the first key. Thus, for protection of an interface between the MSGin5G UE and the MSGin5G server, no authentication credential needs to be preset at the MSGin5G UE, no additional authentication mechanism, such as an authenti- cation mechanism using the SEAL architecture, the EAP authentication framework, etc., is needed, and no new requirement is put on the UE. Fast authentication between the MSGin5G UE and the MSGin5G server at the applica- tion layer is implemented only based on the AKMA service, thereby securing the interface between the MSGin5G UE and the MSGin5G server.

The disclosure is further elaborated below with reference to an application embodiment.

Figure 6:
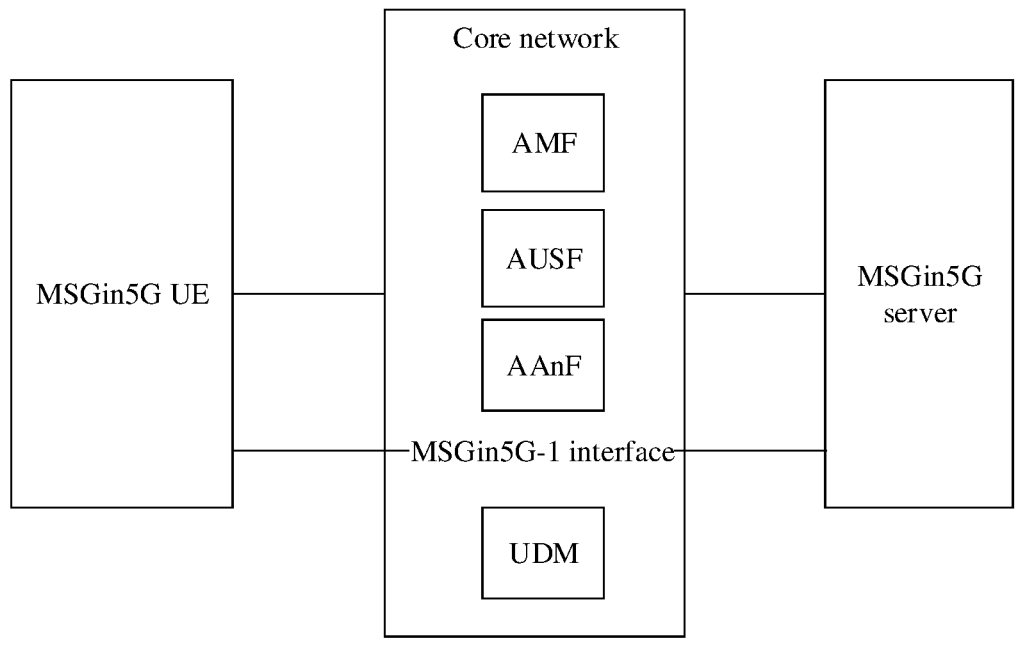
FIG. 6 is a schematic diagram of a network architecture according to an application embodiment of the disclosure.

In the application embodiment, a security credential (i.e., the first key) for interface protection is established for the MSGin5G UE and the MSGin5G server using an initial credential for accessing the 5G network of the operator (i.e., a key stored in the SIM card of the user and the operator network for the user to access the operator network). That is, after the primary authentication has been completed, an application key (i.e., the first key) is generated using the KAKMA (i.e., the second key) generated by the 5GC as an intermediate key, implementing protection of the MSGin5G-1 interface illustrated in FIG. 6.

Figure 7:
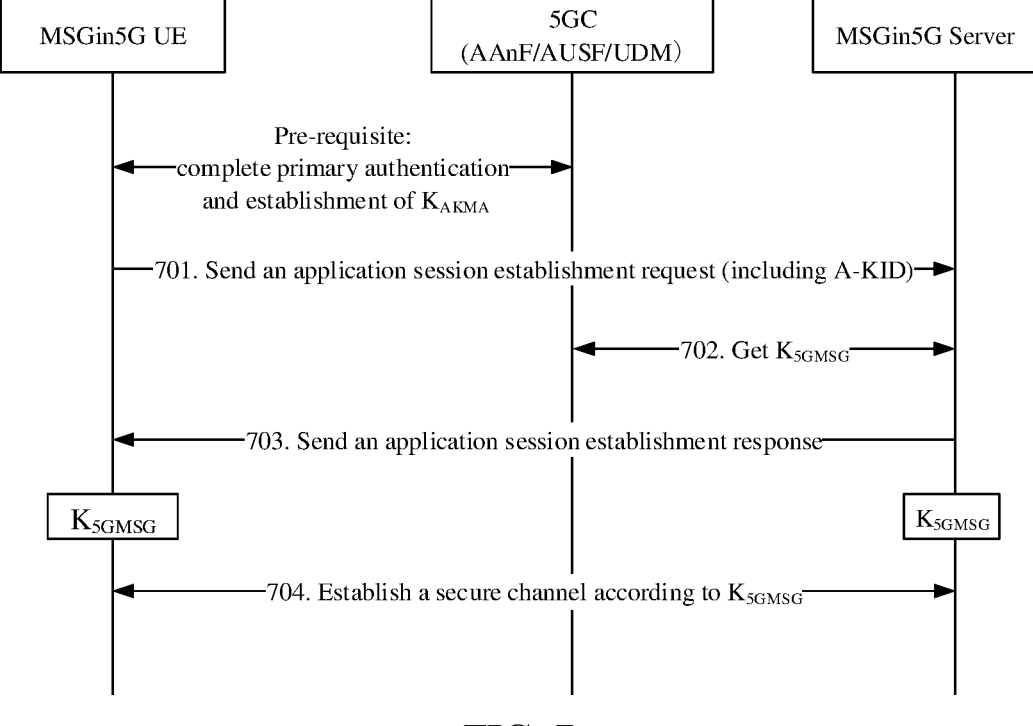
FIG. 7 is a schematic flowchart of authentication between an MSGin5G UE and an MSGin5G server according to an application embodiment of the disclosure.

In the application embodiment, given that the MSGin5G UE interacts with the core network, completes the primary authentication and establishes (i.e., acquires) the KAKMA, as shown in FIG. 7, the process of the authentication between the MSGin5G UE and the MSGin5G server spe- cifically includes operations as follows.

In 701, the MSGin5G UE sends an application session establishment request (carrying the A-KID, i.e., the first ID) to the MSGin5G server. Then, the process may go to 702.

In 702, the MSGin5G server acquires a K5GMSG (i.e., the first key) from the 5GC. Then, the process may go to 703.

Here, after receiving the session establishment request, the MSGin5G server may request a key from the core network using the A-KID and the MSGin5G Server ID. The core network may determine the KAKMA according to the A-KID, generate the K5GMSG using the KAKMA and the MSGin5G Server ID, and send the generated K5GMSG and a key cycle of the K5GMSG to the MSGin5G server.

In actual application, the core network may generate the K5GMSG using a formula as follows.

$$K5GMSG = KDF(KAKMA, MSGin5G \text{ Server } ID) \qquad (1)$$

In actual application, the lifecycle of the K5GMSG may be set by the AAnF according to the requirements of the 5G message service and a key management policy of the operator. The MSGin5G server may send a key update request to the 5GC when the key is about to expire. After receiving the key update request, the 5GC may generate a new K5GMSG according to the AKMA service.

In 703, the MSGin5G server sends an application session establishment response to the MSGin5G UE. Then, the process may go to 704.

Here, the application session establishment response may include the MSGin5G Server ID. The application session establishment response may be configured to instruct the MSGin5G UE to generate the K5GMSG. After receiving the application session establishment response, the MSGin5G UE may generate the K5GMSG using the formula (1).

In 704, the MSGin5G UE and the MSGin5G server establishes a secure channel according to the K5GMSG.

In actual application, the MSGin5G UE and the MSGin5G server may establish a TLS secure channel according to the K5GMSG, to secure the MSGin5G-1 interface. Specifically, the process of establishing the TLS secure channel using the K5GMSG includes operations as follows.

1) The MSGin5G UE may send a connecting request (i.e., the TLS secure channel establishment request mentioned above) to the MSGin5G server. A client hello message in the connecting request may include information on a PSK-based encryption algorithm (i.e., the second information) and information indicating that the MSGin5G UE supports PSK-based TLS (i.e., the third information).

2) The MSGin5G server may send a server hello message (i.e., the TLS secure channel establishment response mentioned above) including a selected encryption algorithm to the MSGin5G UE, while sending a Server-KeyExchange message (i.e., the fourth information mentioned above) including "3GPP-AKMA" to the MSGin5G UE, to inform the MSGin5G UE that the MSGin5G server supports the AKMA protocol.

3) The MSGin5G UE may derive (i.e., generate) the premaster key (i.e., the third key mentioned above) for TLS using the K5GMSG, and then send the Cli-entKeyExchange message including the A-KID to the MSGin5G server.

4) The MSGin5G server may acquire the K5GMSG according to the received A-KID, derive the premaster key for TLS using the K5GMSG, and send the Change-CipherSuite message and the finished message to the UE to end the TLS handshake and establish the TLS tunnel.

5) Data exchange between the MSGin5G UE and the MSGin5G server may be protected by the TLS tunnel.

The solution according to the application embodiment has advantages as follows.

1) The MSGin5G UE does not need to preset any credential for the second authentication. Authentication between the MSGin5G UE and the MSGin5G server may be implemented based on the AKMA service using the primary authentication credential for accessing the 5G network.

2) The authentication between the MSGin5G UE and the MSGin5G server at the application layer is performed using the primary authentication credential for the 5GC and the application key (i.e., the K5GMSG), requiring no additional authentication mechanism. That is, the MSGin5G server is not required to support the EAP authentication framework.

3) The need for authentication between a lightweight MSGin5G UE and the MSGin5G server is met, without putting any new requirement on the MSGin5G UE (i.e., installation of the SEAL client is not required).

Figure 8:
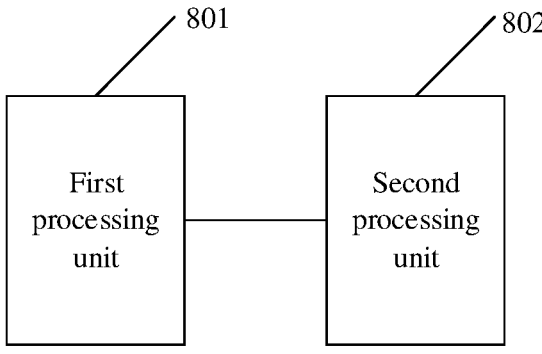
FIG. 8 is a schematic diagram of a structure of an apparatus for secure channel establishment according to an embodiment of the disclosure.

To implement the method at the MSGin5G UE side according to embodiments of the disclosure, the embodi-ments of the disclosure further provide an apparatus for secure channel establishment, arranged on an MSGin5G UE. As shown in FIG. 8, the apparatus may include a first processing unit 801 and a second processing unit 802.

The first processing unit 801 is configured to generate a first key based on an AKMA service.

The second processing unit 802 is configured to establish a secure channel between the MSGin5G UE and an MSGin5G server based on the first key.

In an embodiment, the second processing unit 802 is further configured to: generate a third key based on the first key, and send a client key exchange message including a first identity (ID) to the MSGin5G server; and establish a trans-port layer security (TLS) secure channel between the MSGin5G UE and the MSGin5G server.

In an embodiment, the first processing unit 801 is further configured to perform primary authentication between the MSGin5G UE and a core network before generating the first key based on the AKMA service.

In an embodiment, the first processing unit 801 is further configured to: send a session establishment request to the MSGin5G server, the session establishment request includ-ing at least a first identity (ID); and generate the first key using a second key identified by the first ID.

The second key and the first ID may be generated based on the AKMA service.

In an embodiment, the first processing unit 801 is further configured to generate the first key using the second key identified by the first ID before or after sending the session establishment request to the MSGin5G server.

In an embodiment, the first processing unit 801 is further configured to receive a session establishment response sent by the MSGin5G server.

The first key may be generated before or after the session establishment response is received.

In actual application, the first processing unit 801 and the second processing unit 802 may be implemented by a processor combining a communication interface in the appa-ratus for secure channel establishment.

Figure 9:
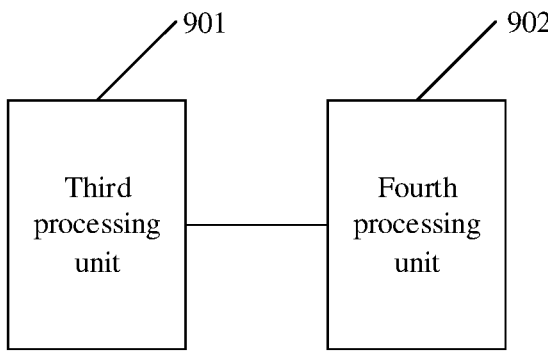
FIG. 9 is a schematic diagram of a structure of another apparatus for secure channel establishment according to an embodiment of the disclosure.

To implement the method at the MSGin5G server side according to embodiments of the disclosure, the embodi-ments of the disclosure further provide an apparatus for secure channel establishment, arranged on an MSGin5G server. As shown in FIG. 9, the apparatus may include a third processing unit 901 and a fourth processing unit 902.

The third processing unit 901 is configured to acquire a first key based on an AKMA service.

The fourth processing unit 902 is configured to establish a secure channel between the MSGin5G server and an MSGin5G UE based on the first key.

In an embodiment, the fourth processing unit 902 is further configured to: receive a client key exchange message sent by the MSGin5G UE, the client key exchange message including a first identity (ID); and acquire the first key according to the first ID, generate a third key using the first key, and establish a transport layer security (TLS) secure channel between the MSGin5G server and the MSGin5G UE.

In an embodiment, the third processing unit 901 is further configured to: receive a session establishment request sent by the MSGin5G UE, the session establishment request including at least a first ID; send a key request to a core network, the key request including at least the first ID; and receive first information sent by the core network. The first information may include at least the first key. The first key may be generated based on a second key identified by the first ID. The second key and the first ID may be generated based on the AKMA service.

In actual application, the third processing unit 901 and the fourth processing unit 902 may be implemented by a processor combining a communication interface in the apparatus for secure channel establishment.

It is to be noted that establishment of a secure channel by the apparatus for secure channel establishment according to the embodiment is merely illustrative by division of the above program modules. In actual application, the processing may be allocated to be carried out by different program modules as needed. That is, an internal structure of the apparatus may be divided into different program modules for carrying out all or part of the processing. In addition, the apparatus for secure channel establishment according to an above embodiment belongs to the same concept as the method for secure channel establishment, and the specific implementation of the apparatus may refer to the method embodiment, which is not repeated here.

Figure 10:
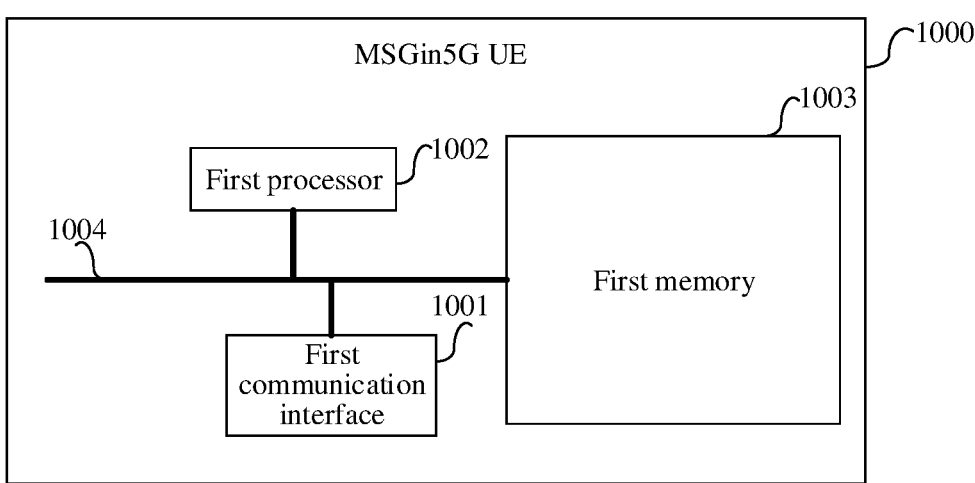
FIG. 10 is a schematic diagram of a structure of an MSGin5G UE according to an embodiment of the disclosure.

Based on hardware implementation of the program modules, and to implement the method at the MSGin5G UE side according to embodiments of the disclosure, the embodiments of the disclosure further provide an MSGin5G UE. As shown in FIG. 10, the MSGin5G UE 1000 may include a first communication interface 1001, a first processor 1002, and a first memory 1003.

The first communication interface 1001 may exchange information with an MSGin5G server.

The first processor 1002 may be connected to the first communication interface 1001 to exchange information with the MSGin5G server, and may be configured to execute a computer program to perform the method according to one or more technical solutions at the MSGin5G UE side.

The computer program may be stored on the first memory 1003.

Specifically, the first processor 1002 is configured to: generate a first key based on an AKMA service; and establish a secure channel between the MSGin5G UE 1000 and the MSGin5G server based on the first key.

In an embodiment, the first processor 1002 is further configured to: generate a third key based on the first key, and send a client key exchange message including a first identity (ID) to the MSGin5G server through the first communication interface 1001; and establish a TLS secure channel between the MSGin5G UE and the MSGin5G server.

In an embodiment, the first processor 1002 is further configured to perform primary authentication between the MSGin5G UE and a core network before generating the first key based on the AKMA service.

In an embodiment, the first processor 1002 is further configured to: send a session establishment request to the MSGin5G server through the first communication interface 1001, the session establishment request including at least a first ID; and generate the first key using a second key identified by the first ID.

The second key and the first ID may be generated based on the AKMA service.

In an embodiment, the first processor 1002 is further configured to generate the first key using the second key identified by the first ID before or after sending the session establishment request to the MSGin5G server.

In an embodiment, the first processor 1002 is further configured to receive a session establishment response sent by the MSGin5G server through the first communication interface 1001.

The first key may be generated before or after receiving the session establishment response.

It is to be noted that any specific processing process by the first processor 1002 and the first communication interface 1001 may be understood by referring to the above method.

Of course, in actual application, various components in the MSGin5G UE 1000 may be coupled together through a bus system 1004. Understandably, the bus system 1004 is configured to implement connection and communication among these components. In addition to a data bus, the bus system 1004 may further include a power bus, a control bus, and a status signal bus. However, for clarity of description, various buses are marked as the bus system 1004 in FIG. 10.

The first memory 1003 in embodiments of the disclosure is configured to store various types of data to support operations of the MSGin5G UE 1000. Examples of these data include any computer programs configured to operate on the MSGin5G UE 1000.

The method disclosed by the embodiments of the disclosure may be applied to the first processor 1002, or implemented by the first processor 1002. The first processor 1002 may be an integrated circuit chip and has a signal processing capability. During an implementation process, each operation in the above method may be completed via an integrated logic circuit of hardware in the first processor 1002 or an instruction in a software form. The first processor 1002 may be a universal processor, a Digital Signal Processor (DSP), or other programmable logic devices, discrete gates or transistor logic devices, and discrete hardware component, etc. Each method, operation and logic block diagram disclosed in the embodiments of the disclosure may be implemented or executed by the first processor 1002. The universal processor may be a microprocessor or any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a storage medium. The storage medium is located in the first memory 1003. The first processor 1002 reads information from the first memory 1003 and completes the operations of the foregoing methods in combination with the hardware of the first processor 1002.

In an exemplary embodiment, the MSGin5G UE 1000 may be implemented by one or more application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors, or other electronic components, to implement the above methods.

Figure 11:
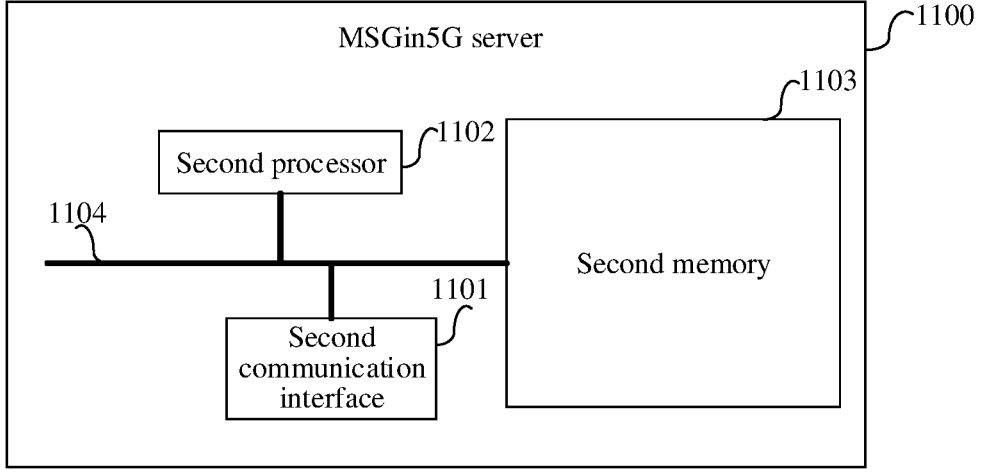
FIG. 11 is a schematic diagram of a structure of an MSGin5G server according to embodiments of the disclosure.

Based on hardware implementation of the program modules, and to implement the method at the MSGin5G server side according to embodiments of the disclosure, the embodiments of the disclosure further provide an MSGin5G server. As shown in FIG. 11, the MSGin5G server 1100 may include a second communication interface 1101, a second processor 1102, and a second memory 1103.

The second communication interface 1101 may exchange information with an MSGin5G UE.

The second processor 1102 may be connected to the second communication interface 1101 to exchange information with the MSGin5G UE, and may be configured to execute a computer program to perform the method according to one or more technical solutions at the MSGin5G server side.

The computer program may be stored on the second memory 1103.

Specifically, the second processor 1102 is configured to: acquire a first key based on an AKMA service; and establish a secure channel between the MSGin5G server 1100 and the MSGin5G UE based on the first key.

In an embodiment, the second processor 1102 is further configured to: receive a client key exchange message sent by the MSGin5G UE through the second communication interface 1101, the client key exchange message including a first ID; and acquire the first key according to the first ID, generate a third key using the first key, and establish a TLS secure channel between the MSGin5G server and the MSGin5G UE.

In an embodiment, the second processor 1102 is further configured to: receive a session establishment request sent by the MSGin5G UE through the second communication interface 1101, the session establishment request including at least a first ID; send a key request to a core network through the second communication interface 1101, the key request including at least the first ID; and receive first information sent by the core network through the second communication interface 1101.

The first information may include at least the first key. The first key may be generated based on a second key identified by the first ID. The second key and the first ID may be generated based on the AKMA service.

It is to be noted that any specific processing process by the second processor 1102 and the second communication interface 1101 may be understood by referring to the above method.

Of course, in actual application, various components in the MSGin5G server 1100 may be coupled together through a bus system 1104. Understandably, the bus system 1104 is configured to implement connection and communication among these components. In addition to a data bus, the bus system 1104 may further include a power bus, a control bus, and a status signal bus. However, for clarity of description, various buses are marked as the bus system 1104 in FIG. 11.

The second memory 1103 in embodiments of the disclosure is configured to store various types of data to support operations of the MSGin5G server 1100. Examples of these data include any computer programs configured to operate on the MSGin5G server 1100.

The method disclosed by the embodiments of the disclosure may be applied to the second processor 1102, or implemented by the second processor 1102. The second processor 1102 may be an integrated circuit chip and has a signal processing capability. During an implementation process, each operation in the above method may be completed via an integrated logic circuit of hardware in the second processor 1102 or an instruction in a software form. The second processor 1102 may be a universal processor, a Digital Signal Processor (DSP), or other programmable logic devices, discrete gates or transistor logic devices, and discrete hardware component, etc. Each method, operation and logic block diagram disclosed in the embodiments of the disclosure may be implemented or executed by the second processor 1102. The universal processor may be a microprocessor or any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a storage medium. The storage medium is located in the second memory 1103. The second processor 1102 reads information from the second memory 1103 and completes the operations of the foregoing methods in combination with the hardware of the second processor 1102.

In an exemplary embodiment, the MSGin5G server 1100 may be implemented by one or more ASICs, DSPs, PLDs, CPLDs, FPGAs, general-purpose processors, controllers, MCUs, microprocessors, or other electronic components, to implement the above methods.

It may be understood that the memory (the first memory 1003, the second memory 1103) in the embodiments of the disclosure may be a volatile memory or a non-volatile memory, or may include the volatile memory and the non-volatile memory. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc (CD), or a compact disc read-only memory (CD-ROM). The magnetic surface memory may be a disk storage or a tape storage. The volatile memory may be a random access memory (RAM) and is used as an external high-speed cache. It is exemplarily but unlimitedly described that RAMs in various forms may be adopted, such as a static random access memory (SRAM), a synchronous static random access memory (SSRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synclink dynamic random access memory (SLDRAM), a direct rambus random access memory (DRRAM), etc. The memory described in the disclosure is intended to include but not limited to memories of these and any other suitable type.

Figure 12:
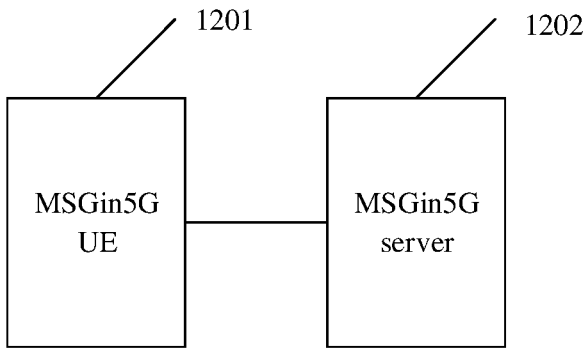
FIG. 12 is a schematic diagram of a structure of a system for secure channel establishment according to an embodiment of the disclosure.

To implement the method according to embodiments of the disclosure, the embodiments of the disclosure further provide a system for secure channel establishment. As shown in FIG. 12, the system may include an MSGin5G UE 1201 and an MSGin5G server 1202.

It is to be noted that any specific processing process by the MSGin5G UE 1201 and the MSGin5G server 1202 is as elaborated above, which is not repeated here.

In an exemplary embodiment, embodiments of the disclosure further provide a storage medium, i.e., a computer storage medium, specifically a computer-readable storage medium, including the first memory 1003 storing a computer program, for example. The computer program may be executed by the first processor 1002 of the MSGin5G UE 1000 to perform the operations of the above method at the MSGin5G UE side. As another example, the storage medium includes the second memory 1103 storing a computer program. The computer program may be executed by the second processor 1102 of the MSGin5G server 1100 to perform the operations of the above method at the MSGin5G server side. The computer-readable storage medium may be a memory such as a FRAM, a ROM, a PROM, an EPROM, an EEPROM, a flash memory, a magnetic surface memory, a CD, or a CD-ROM, etc.

It is to be noted that term "first", "second" and the like is only for distinguishing similar objects, and does not represent a specific sequence of the objects.

In addition, the solutions according to embodiments of the disclosure may be freely combined without conflicts.

The above is only the implementation of the disclosure and not intended to limit the scope of protection of the disclosure.

The invention claimed is:

1. A method for secure channel establishment, applied to a fifth generation message (MSGin5G) user equipment (UE), the method comprising:

generating a first key based on an authentication and key management for application (AKMA) service; and establishing a secure channel between the MSGin5G UE and an MSGin5G server based on the first key;

wherein establishing the secure channel between the MSGin5G UE and the MSGin5G server based on the first key comprises:

generating a third key based on the first key, and sending a client key exchange message comprising a first identity (ID) to the MSGin5G server, wherein the third key is a premaster key; and establishing a transport layer security (TLS) secure channel between the MSGin5G UE and the MSGin5G server using the third key.

2. The method of claim 1, further comprising: before generating the first key based on the AKMA service, performing primary authentication between the MSGin5G UE and a core network.

3. The method of claim 1, wherein generating the first key based on the AKMA service comprises:

sending a session establishment request to the MSGin5G server, the session establishment request comprising at least the first ID; and generating the first key using a second key identified by the first ID, the second key and the first ID being generated based on the AKMA service.

4. The method of claim 3, wherein generation of the first key using the second key identified by the first ID is performed before or after sending the session establishment request to the MSGin5G server.

5. The method of claim 3, further comprising:

receiving a session establishment response sent by the MSGin5G server, wherein generation of the first key is performed before or after receiving the session establishment response.

6. A method for secure channel establishment, applied to a fifth generation message (MSGin5G) server, the method comprising:

acquiring a first key based on an authentication and key management for application (AKMA) service; and establishing a secure channel between the MSGin5G server and an MSGin5G user equipment (UE) based on the first key;

wherein establishing the secure channel between the MSGin5G server and the MSGin5G UE based on the first key comprises:

receiving a client key exchange message sent by the MSGin5G UE, the client key exchange message comprising a first identity (ID); and acquiring the first key according to the first ID, generating a third key using the first key, and establishing a transport layer security (TLS) secure channel between the MSGin5G server and the MSGin5G UE using the third key, wherein the third key is a premaster key.

7. The method of claim 6, wherein acquiring the first key based on the AKMA service comprises:

receiving a session establishment request sent by the MSGin5G UE, the session establishment request comprising at least the first ID;

sending a key request to a core network, the key request comprising at least the first ID; and receiving first information sent by the core network, the first information comprising at least the first key, the first key being generated based on a second key identified by the first ID, the second key and the first ID being generated based on the AKMA service.

8. The method of claim 7, wherein first information further comprises a cycle of the first key.

9. A fifth generation message (MSGin5G) user equipment (UE), comprising a first communication interface and a first processor, wherein the first processor is configured to:

generate a first key based on an authentication and key management for application (AKMA) service; and establish a secure channel between the MSGin5G UE and an MSGin5G server based on the first key;

wherein the first processor is further configured to:

generate a third key based on the first key, and send a client key exchange message comprising a first identity (ID) to the MSGin5G server through the first communication interface, wherein the third key is a premaster key; and establish a transport layer security (TLS) secure channel between the MSGin5G UE and the MSGin5G server using the third key.

10. The MSGin5G UE of claim 9, wherein the first processor is configured to: before generating the first key based on the AKMA service, perform primary authentication between the MSGin5G UE and a core network.

11. The MSGin5G UE of claim 9, wherein the first processor is configured to:

send a session establishment request to the MSGin5G server through the first communication interface, the session establishment request comprising at least the first ID; and generate the first key using a second key identified by the first ID, the second key and the first ID being generated based on the AKMA service.

12. The MSGin5G UE of claim 11, wherein generation of the first key using the second key identified by the first ID is performed before or after sending the session establishment request to the MSGin5G server.

13. The MSGin5G UE of claim 11, wherein the first processor is configured to:

receive a session establishment response sent by the MSGin5G server through the first communication interface, wherein generation of the first key is performed before or after receiving the session establishment response.

* * * * *